United States Patent [19]

Ljung

[11] 4,386,853
[45] Jun. 7, 1983

[54] BENDING ACTUATOR FOR RING LASER GYROSCOPE

[75] Inventor: Bo H. G. Ljung, Wayne, N.J.

[73] Assignee: The Singer Company, Little Falls, N.J.

[21] Appl. No.: 211,992

[22] Filed: Dec. 1, 1980

[51] Int. Cl.³ ............................................. G01C 19/64
[52] U.S. Cl. ..................................... 356/350; 372/94
[58] Field of Search ................. 356/350, 351; 372/94, 372/32, 103

[56] References Cited

U.S. PATENT DOCUMENTS 4,113,387  9/1978  Shutt ............................ 356/106 LR
4,152,071  5/1979  Podgorski .................... 356/106 LR Primary Examiner—Vincent P. McGraw
Attorney, Agent, or Firm—John C. Altmiller; Thomas W. Kennedy

[57] ABSTRACT

Bias shift caused by distortion of a ring laser gyroscope block is corrected by bending the block. Electromechanical bending devices may be piezoelectric crystals adherently attached to the block and resposive to voltage derived from distorting influences.

11 Claims, 4 Drawing Figures

BENDING ACTUATOR FOR RING LASER GYROSCOPE

BACKGROUND OF THE INVENTION

This invention relates to a new and improved ring laser gyroscope. More particularly, the invention relates to means for correcting bias shifts due to acceleration or changes in temperature in a ring laser gyroscope.

DESCRIPTION OF THE PRIOR ART

As compared to a conventional gyroscope, a ring laser gyroscope is quite insensitive to environmental influences such as changes in temperature and in acceleration. However, when such changes cause the block of the ring laser gyroscope to bend, bias shifts adversely affecting the performance of the gyroscope can result.

A ring laser gyroscope typically comprises a cavity having three mirrors with capillary holes joining the mirrors. Two of the mirrors are plane surfaces and one is concave, having a radius ranging from approximately 0.5 to 10 meters. Bending or flexing the block causes displacement of the lasing plane in the cavity. Tilting of one of the mirrors can also cause a shift of the lasing plane. In both cases, the important parameter is the change of the pyramid angle of the gyroscope. The pyramid angle of a ring laser gyroscope is the angle formed by extending three imaginary planes, each containing one of the three mirrors of the gyroscope, in the same direction along the central axis of the gyroscope and considering the planes to be slightly tilted towards the axis. A tilt of a mirror on the order of $\frac{1}{2}$ arcsecond can cause the plane of the lasing to move up or down by 0.001 inch. By comparison, a like rotation of one of the mirrors in the plane of the ring laser causes only a small shift of the laser beams, in the order of 0.000010 inch.

Usually, the ring laser gyroscope is so made that the plasma which produces gain in, for example, a helium-neon laser, is symmetric as to the right and left sides of the gyroscope. Ideally, in such a structure, the bias caused by Langmuir flow of matter between the two anodes and the cathode is zero, due to balanced current flow from the anodes. Small errors in hole diameter and bore location in the plane of the ring laser result in a fixed bias which is not "tilt-sensative". Small errors in bore location, out of the preferred laser plane or between the right and left sides, cause a bias that is sensitive to pyramid angle shifts.

U.S. Pat. No. 4,113,387 describes a ring laser gyroscope having a tiltable mirror which is designed to minimize tilt bias error of the type just described. This design uses a path length controlling mirror which is combined with a tilt mechanism. The tilt of the mirror is servo controlled, and is made to rock back and forth with a small amplitude. The resulting intensity modulation of the laser is demodulated and integrated to produce a signal which is then fed back, via a high voltage amplifier, to tilt the mirror in the direction of maximum lasing power. The power in the laser is usually maximum when the beam is centered in the aperture.

Success with this arrangement hinges on two factors: the gyroscope must not be constantly disturbed by the necessary rocking of the tiltable mirror, and the position of the aperture must be representative of the beam location with respect to the bore. The tiltable mirror without the feedback is quite flimsy and allows large tilts. When tilt-servoed, such a mirror has worked as well as fixed mirrors. But with the servo not functioning, the bias stability has been worse. It appears that the tilt-servoed mirror corrects for its own errors, but does not reduce other tilt-induced bias shifts.

SUMMARY OF THE INVENTION

According to the present invention, bias shifts in ring laser gyroscopes arising from acceleration or temperature gradient changes can be eliminated by bending a ring laser gyroscope block in an amount substantially proportional to the change. This method can be implemented by applying a voltage proportional to measured change in acceleration and/or temperature gradient to one or more electromechanical transducers coupled to the block. The voltage may be applied, for example, to one or more piezoelectric crystals bonded to top and bottom faces of the ring laser gyroscope block. The block can thus be bent to change the pyramid angle by an amount sufficient to offset changes in the pyramid angle caused by bending due to temperature gradient and acceleration changes, and, hence, to eliminate this as a source of bias. Because the action of the piezoelectric actuators is substantially linear and, therefore, predictable, the bending of the block can be accomplished by means of an open-ended control system, with considerable simplification of the control circuitry and consequent reduction in system cost. For instances when the characteristics of a ring laser block are not accurately known, the bending voltage is provided by means of an amplitude responsive feed-back system.

DETAILED DESCRIPTION OF THE INVENTION

Figure 1:
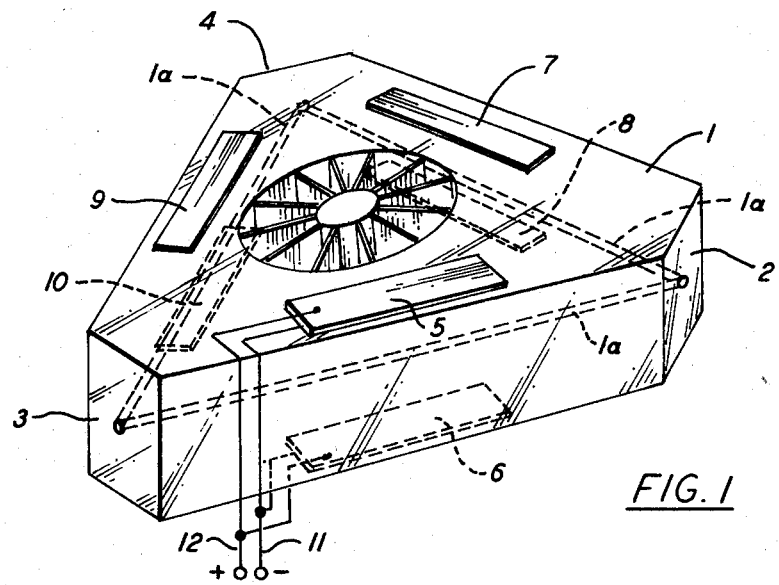
FIG. 1 is a view, in perspective, of a ring laser gyroscope embodying the invention.
Figure 2:
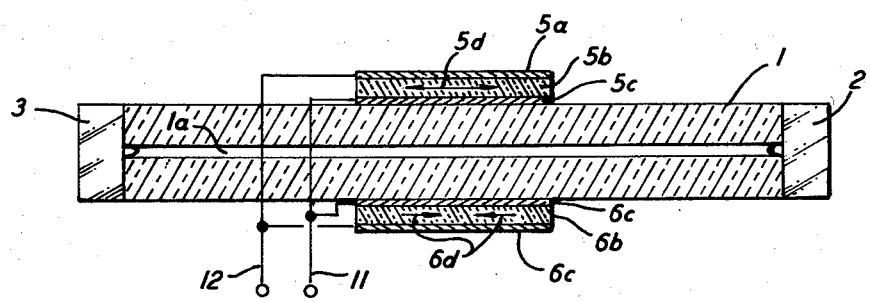
FIG. 2 is a view of the gyroscope of FIG. 1 taken from a side so as to show one pair of crystals.

It has been found that the block of a ring laser gyroscope can be bent by means of electromechanical transducers, such as thin piezoelectric crystals, coupled to the top and bottom faces of the ring laser block. Such an arrangement is shown in FIG. 1 where ring laser block 1 has a conventionally excited triangular cavity (dashed lines) located between three conventional mirror faces 2, 3 and 4. The crystals may be bonded to the block by means of an epoxy cement. Ring laser block 1 can be made of quartz or ceramic. A preferred material is the glass ceramic sold under the trademark Zerodur, which has a zero coefficient of expansion. In the illustrated embodiment, six piezoelectric crystals, marked 5 through 10 in FIG. 1, are bonded to top and bottom faces of block 1, with three on each face. The crystals are located in pairs on either side of each leg of the cavity. Each crystal actuator element 5 to 10 comprises a long, thin, rectangular body of piezoelectric crystal. The piezoelectric crystal may be doped lead-zirconium-titanate. Each crystal has means for making connection to a drive voltage. As is clearly visible in FIG. 2 where only crystals 5 and 6 are shown, silver or nickel electrodes 5a, 6c and 6a, 6c, are provided on opposite sides of the piezoelectric crystals 5b and 6b, respectively. The crystal orientation (polarization) and electrical connections are so arranged that when a pair of crystals 5 and 6 is oppositely mounted on the faces of laser block 1, simultaneous application of a voltage to each crystal will cause one crystal to lengthen, and the other crystal to contract. The action of each crystal, shown by means of arrows 5d and 6d, respectively, in FIG. 2, is to concurrently apply a bending moment to block 1 in the plane of the cavity path between the electrodes.

As will be understood, crystals 5, 7 and 9 are connected together in parallel and to lines 11 and 12, as are crystals 6, 8, and 10. (In FIG. 2, only the connections to crystals 5 and 6 are shown.) The interconnection of the crystals to lines 11 and 12 is such that the crystals on top of the block expand lengthwise at the same time that the crystals on the bottom contract. The effect of the bending of each crystal in causing the block to bend is cumulative. A "pyramid angle" deflection of block 1 results. The change in pyramid angle in response to the applied voltage can be made quite predictable with low hysteresis in the order of 2%. In one gyroscope, using a "Zerodur" ring laser gyro block which was 1⅛ inch in thickness, a pyramid angle of ±2.25 sec was obtained when ±250 volts was applied to the six lead-zirconium-titanate crystals. Such a pyramid angle is sufficient to compensate errors caused by temperature gradient changes and acceleration changes. While it is possible to drive the above-described bending actuator with a feedback loop arrangement such as that disclosed in the above-mentioned U.S. Pat. No. 4,133,387, because of the linearity inherent in the actuator of the present invention, it is also possible to drive it with open loop. Such a circuit is shown in FIG. 3.

Figure 3:
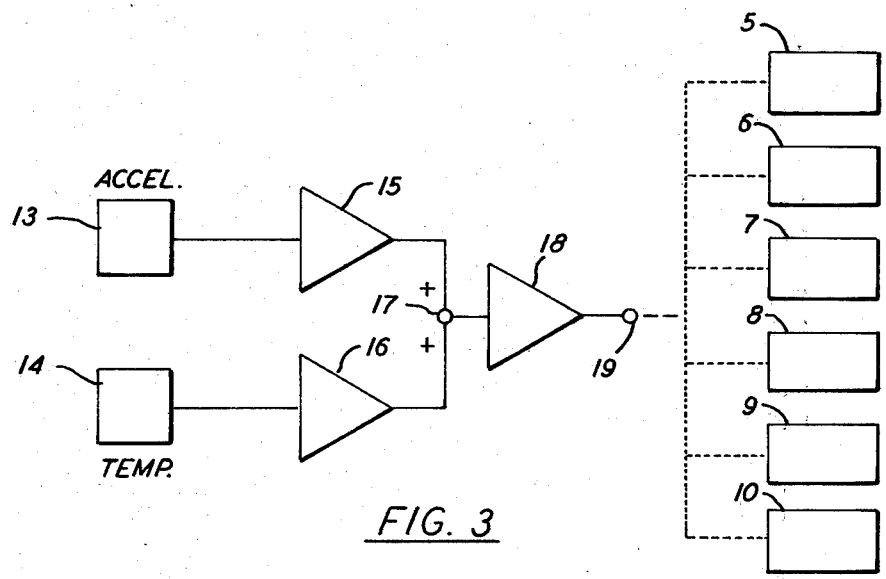
FIG. 3 is a schematic diagram showing the manner of driving the gyroscope of FIGS. 1.

In FIG. 3, signals proportional to acceleration and to temperature gradient, the natural forces which cause the gyroscope block to bend, are fed from sensors 13 and 14 to variable gain control amplifiers 15 and 16, respectively. The outputs of amplifiers 15 and 16 are fed to summing junction 17 at the input of amplifier 18. From amplifier output 19, the drive signals are fed to the electrodes on the crystals. Acceleration sensor 13 and temperature sensor 14 may respectively be an accelerometer providing a signal voltage which is proportional to acceleration and a pair of thermometers providing a signal voltage which is proportional to temperature gradient; such devices are well known in the art. Or, appropriate signals already available, for example, in an inertial navigation system, may be supplied to amplifiers 15 and 16.

While, as stated above, the present invention makes possible direct correction of gyroscope pyramid angle in response to signal voltages which are proportional to measured changes in the gyroscope environment, the invention also has utility in situations where there are other considerations. Thus, where the characteristics of the laser block are not known, it has been found desirable to employ a closed loop system for correcting pyramid angles. Such a system is shown in FIG. 4.

Figure 4:
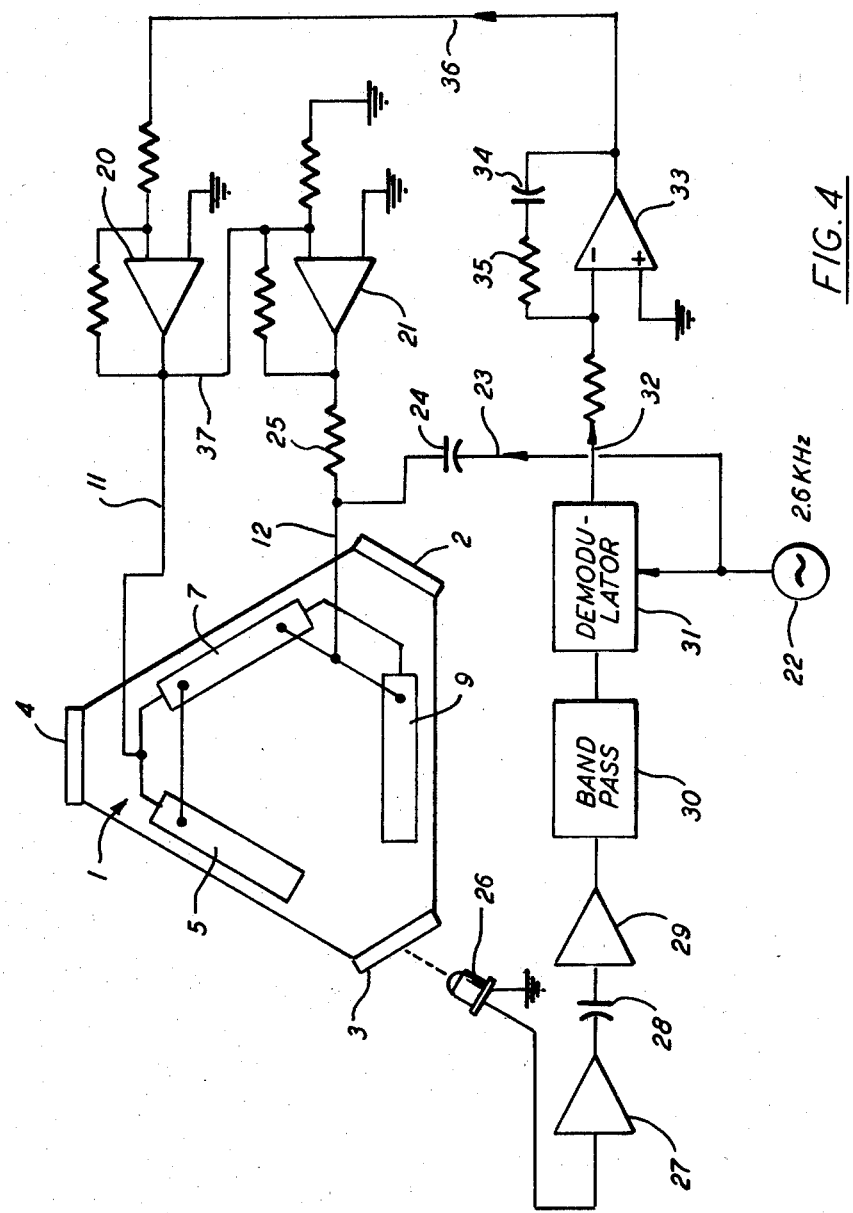
FIG. 4 shows a closed loop system for correcting pyramid angles in accordance with the invention.

In the closed loop control system of FIG. 4, a ring laser gyro block 1 is provided, as described above, with mirror faces 2, 3, and 4. Bending actuators 5, 7, and 9, fastened to the top of the block, are duplicated by actuators on the underside of the block, which cannot be seen in this figure. The actuators are coupled via connecting leads 11 and 12 to the outputs of high voltage amplifier 20 and inverting high voltage amplifier 21, respectively. A 2.6 kilohertz alternating signal is coupled on line 23 from oscillator 22, via coupling capacitor 24, to actuator connecting lead 12, thereby becoming impressed on the body actuators. Resistor 25, connected between inverting amplifier 21 and connecting lead 12, provides isolation for the low impedance output of amplifier 21 so that, even if amplifiers 20 and 21 were to saturate at a voltage close to the level of thin supply voltage, voltage would continue to be supplied to the actuators and malfunction of the servo due to saturated amplifier outputs thus avoided.

The application of the 2.6 kilohertz AC voltage to the bending actuators causes block 1 to bend in an amount of about 0.1 arcseconds or less, at the 2.6 kilohertz rate. The resulting bending of the block causes an intensity variation in the laser light beam due to variation in diffraction loss in the aperture of the cavity of the ring laser gyroscope. Light from the lasing action in the ring laser gyroscope is detected by photodetector 26 which is positioned to receive light penetrating mirror 3, and is amplified in amplifier 27. The signal from photodetector 26 is coupled, via capacitor 28, to amplifier 29 and thence to band pass filter 30. Capacitor 28 provides coupling for the AC signal while preventing saturation of amplifier 29 due to DC offsets. Band pass filter 30 passes that portion of the signal which carries the tilt information while rejecting noise of a broad band character. This assures that the signal fed from the filter to the input of demodulator 31 does not overload the demodulator. Demodulator 31, which is illustrated as a synchronous detector, is supplied a 2.6 kilohertz signal from oscillator 22 and provides an output error signal on line 32. The error signal from demodulator 31 is integrated in porportional integrator 33, which has both integral and proportional control given by way of capacitor 34 and resistor 35 in its feed-back loop. The output of integrator 33 is fed via line 36 to the input of high voltage amplifier 20. Inverting high voltage amplifier 21 receives its input drive voltage from the output of drive amplifier 20 via connecting lead 37.

In operation, the servo system maximizes the transmission of light through the ring laser gyroscope block by applying DC voltage to the actuators to bend the block in the direction which maximizes the output of the laser beam at mirror 3. By using the servo system in conjunction with block bending as taught by the invention, a substantial improvement in bias stability as compared with prior art systems using, for example, variation of the position of a laser rejecting mirror, is obtained. The system is itself highly stable. It provides an angularly stiff alignment of the ring laser gyroscope with the natural frequency of the ring laser block being high.

While the preferred embodiment of the invention employs six crystals which are symmetrically disposed on each face of the gyroscope block with a pair parallel to each leg of the laser cavity, it will be apparent to those skilled in the art that other actuators other than a piezoelectric crystal may be used to bend the block. Other possible variations in the structure disclosed above will also be apparent to those skilled in the art. Therefore, the below appended claims should be interpreted in keeping with the spirit of the invention rather than limited in scope to the particular embodiment illustrated above.

What is claimed is:

1. An apparatus for correcting bias shift resulting from change in the pyramid angle of a ring laser gyroscope comprising a block containing a cavity in which at least three, interconnected, elongate paths form a loop along which oppositely directed beams of light may travel, comprising:
  at least one electromechanical transducer coupled to the block and adapted to bend the block in response to the application of an electric voltage; and
  means for connecting the transducer to a drive voltage.

2. An apparatus in accordance with claim 1, comprising:
  the cavity lying substantially in a plane in the block and the block having sides generally parallel to the plane;
  an electromechanical transducer coupled to each side of the block and adapted to bend the block; and
  means for connecting the transducers to a drive voltage so that, when one transducer elongates, the other contracts.

3. An apparatus in accordance with any one of claim 1 or claim 2 comprising:
  each transducer being elongate and coupled to the block parallel to an elongate path in the cavity.

4. An apparatus in accordance with any one of claims 1–3 in which the electromechanical transducer is a piezoelectric crystal.

5. An apparatus in accordance with claim 1 further comprising:
  means for generating a signal proportional to change in amplitude of one of the beams of light; and
  means for applying a voltage proportional to the signal to the transducer to maximize the amplitude of the beam.

6. A method for correcting bias shift in a ring laser gyroscope resulting from change in the gyroscope pyramid angle, the gyroscope comprising a block containing a cavity in which at least three elongate paths are interconnected to form a loop along which oppositely directed beams of light may travel, comprising the step of:
  bending the block to offset change in the pyramid angle.

7. The method of claim 6 in which the change in gyroscope pyramid angle is the result of a change in acceleration, comprising the steps of:
  measuring change in acceleration experienced by the block; and
  bending the block to offset change in pyramid angle by an amount proportional to the measured change in acceleration.

8. The method of claim 6 in which the change in bias shift is the result of temperature gradient comprising the steps of:
  measuring the temperature gradient of the block; and
  bending the block to offset change in pyramid angle by an amount proportional to the measured temperature gradient.

9. The method of claim 6 in which the change in bias shift is the result of change in temperature gradient and change in acceleration, further comprising the steps of:
  measuring the temperature gradient of the block;
  measuring the change in acceleration experienced by the block;
  adding the measured changes to produce a sum; and
  bending the block to offset change in pyramid angle by an amount proportional to the sum of the measured changes.

10. The method of claim 6 further comprising the steps of:
  coupling an electromechanical transducer to the block; and
  applying a voltage proportional to change in pyramid angle to the transducer to bend the block.

11. The method of claim 6 further comprising:
  coupling an electromechanical transducer to the block;
  operating the ring laser gyroscope and forming a laser beam therein;
  detecting the laser beam and providing an error signal proportional to change in amplitude of the laser beam; and
  applying the error signal to the electromechanical transducer to offset the change in amplitude of the laser beam.

* * * * *